July 31, 1928.
M. A. LOCKWOOD
1,679,252
WINDSHIELD FOR AUTOMOBILES
Filed April 5, 1926
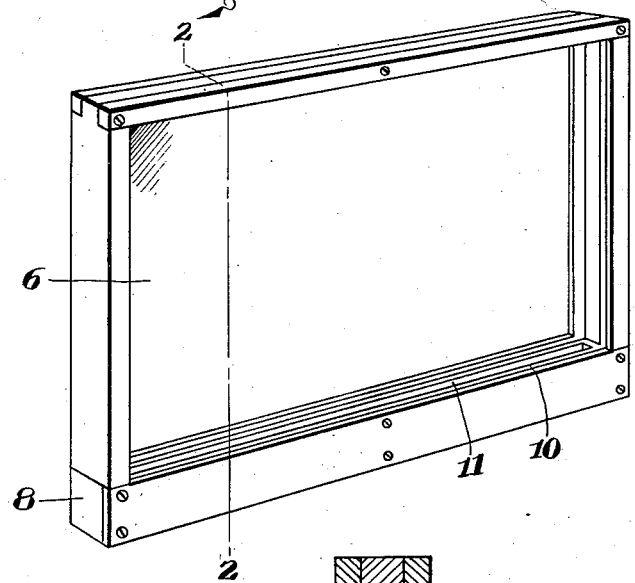
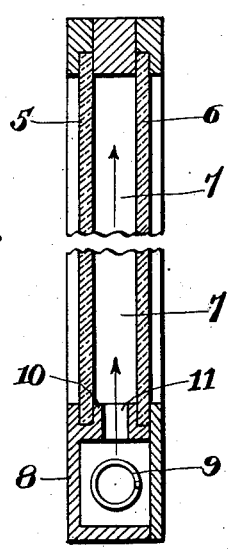
INVENTOR.
Mary A. Lockwood,
BY
Geo. P. Kimmel
ATTORNEY.

Patented July 31, 1928.

1,679,252

UNITED STATES PATENT OFFICE.

MARY A. LOCKWOOD, OF MARGARETVILLE, NEW YORK.

WINDSHIELD FOR AUTOMOBILES.

Application filed April 5, 1926. Serial No. 99,996.

This invention relates to improvements in windshields and has for its primary object to provide a windshield or window as hereinafter described, embodying means to prevent snow and sleet from collecting thereon.

A further object is to provide a windshield or window as aforesaid wherein two transparent panes are mounted in spaced relation, within a metal frame, and wherein a supply of heat is directed between said transparent panes.

A further object is to provide a windshield or window as aforesaid which is simple of construction and economical of manufacture, and which may be readily assembled or disassembled for the interchange of panes, in case one of the latter becomes broken.

Other objects and advantages of the invention will be apparent during the course of the following description.

In the accompanying drawings in which like numerals are employed to designate like parts, Figure 1 is a perspective view of an embodiment of my invention, and Figure 2 is an enlarged section with a central portion broken away, taken on line 2—2 of Figure 1.

In the drawings, wherein for the purpose of illustration is shown an embodiment of my invention, the numerals 5 and 6 designate a pair of similar transparent panes or panels, carried by a frame indicated generally at 4. The panes 5 and 6, as will hereinafter be more particularly described, are disposed within the frame in spaced relation, to form a vertically extending air space 7 therebetween.

The frame 4 is formed with a hollow, rectangular, oblong base or sill 8, having one detachable side 8' in order that ready access may be had to the interior thereof, wherein is disposed an elongated, cylindrical coil 9. The upper wall 10 of the base 8 is provided with a slot 11 which is co-extensive with the coil 9 and forms a connection between the interior of the base 8 and the air space 7 between the panes 5 and 6.

Formed integral with the base 8, are the sides 12 which are reduced at their upper ends as at 13 to form a shoulder 14 on each of their side edges. The sides 12 are connected at their upper ends by means of a horizontal member 15, which is of the same width as the reduced extensions 13 and formed integral therewith.

The upper wall 10 of the base 8 is formed with a groove 16 to receive the lower edge of the pane 5 and with a recess 17 to receive the lower edge of the pane 6, the walls of the recess 17 coacting with the detachable side 8' to form a groove similar to the groove 16. The sides 12 are provided in their inner faces with similar grooves 18 to receive the side edges of the panes 5 and 6, thus it will be seen that the panes 5 and 6 are continuously supported within the frame for the entire length of their lower and side edges.

Seated on the shoulders 14 of the sides 12, are securing strips 19, which fit flush with the side edges of the sides 12 and the upper face of the horizontal member 15. The securing strips 19 are formed with longitudinal recesses 20, which coact with the side faces of the member 15 to form receiving grooves for the upper edges of the panes 5 and 6. The securing strips 19 are held in place by suitable holdfast means such as screws 21, which extend through the strips into the member 15. Similar screws 22 are provided to hold the detachable side 8' of the base 8 in place.

In the assembly of my improved windshield, the panes 5 and 6 are inserted edgewise into the grooves 18 at the upper ends thereof, after which the strips 19 and detachable side 8' are secured in place. If it is desired to remove one of the panes, only the strip 19 adjacent such pane need be removed, whereby the pane may be slid upwardly through the upper edge of the frame. If it is desired to gain access to the interior of the base 8, for the purpose of repairing the coil 9 or the like, this may be accomplished merely by removing the detachable side 8'.

The operation of my device is extremely simple. The coil 9 is heated by means of electric wires suitably connected with the electric circuit of the vehicle, and the heat thrown off by the coil rises through the slot 11 into the air space 7, as indicated by the arrows in Figure 2, thereby heating the panes and causing any snow or sleet which may strike the surface thereof to melt and run off.

What I claim is:—

A device of the character described comprising, a frame embodying a base, a pair of side members and a top member, said base being hollow and having a detachable side, and being provided in its upper wall with a longitudinal groove, a longitudinal recess adjacent the detachable side and a longitudinal slot disposed between said groove and recess, said side members having reduced upper ends to form shoulders thereon and being formed with grooves corresponding to the first mentioned groove, transparent panes slidable in the grooves of the side members to seat in the groove and recess in said base, securing strips seated on said shoulders extending in parallel relation to said top member, and being formed with recesses to receive therein the upper edges of said panes, and a heating coil disposed in said base co-extensive with the slot in the upper wall thereof.

MARY A. LOCKWOOD.